US010644975B2

(12) United States Patent
Duda et al.

(10) Patent No.: US 10,644,975 B2
(45) Date of Patent: May 5, 2020

(54) METHOD AND SYSTEM FOR PROBING FORWARDING ELEMENTS OF NETWORK ELEMENTS

(71) Applicant: Arista Networks, Inc., Santa Clara, CA (US)

(72) Inventors: Kenneth J. Duda, Santa Clara, CA (US); Hugh W. Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 153 days.

(21) Appl. No.: 15/671,454

(22) Filed: Aug. 8, 2017

(65) Prior Publication Data

US 2019/0052556 A1    Feb. 14, 2019

(51) Int. Cl.
*H04L 12/24*    (2006.01)
*H04L 12/26*    (2006.01)
*H04L 12/707*    (2013.01)

(52) U.S. Cl.
CPC ...... *H04L 43/0817* (2013.01); *H04L 41/0659* (2013.01); *H04L 41/0681* (2013.01); *H04L 43/0829* (2013.01); *H04L 43/10* (2013.01); *H04L 43/12* (2013.01); *H04L 43/024* (2013.01); *H04L 43/0852* (2013.01); *H04L 45/22* (2013.01)

(58) Field of Classification Search
CPC ... H04L 43/0817; H04L 45/22; H04L 43/024; H04L 43/0852; H04L 43/10
See application file for complete search history.

(56) References Cited

U.S. PATENT DOCUMENTS

| | | | |
|---|---|---|---|
| 6,459,701 B1 | 10/2002 | Henson et al. | |
| 8,619,599 B1 | 12/2013 | Even | |
| 9,219,617 B2* | 12/2015 | Newton | H04L 12/4641 |
| 2004/0085994 A1 | 5/2004 | Warren et al. | |
| 2004/0257984 A1 | 12/2004 | Johnson et al. | |
| 2008/0025225 A1 | 1/2008 | Kanno | |
| 2010/0110906 A1 | 5/2010 | Ram | |
| 2011/0188386 A1 | 8/2011 | Nicholson et al. | |
| 2016/0352601 A1* | 12/2016 | Zhang | H04L 43/0823 |
| 2018/0062970 A1* | 3/2018 | Abzakh | G06F 11/2007 |

* cited by examiner

*Primary Examiner* — Michael Thier
*Assistant Examiner* — Brian P Cox
(74) *Attorney, Agent, or Firm* — Chamberlain, Hrdlicka, White, Williams & Aughtry (57) ABSTRACT

In general, the invention relates to a method and system for probing forwarding elements of network elements.

20 Claims, 9 Drawing Sheets

METHOD AND SYSTEM FOR PROBING FORWARDING ELEMENTS OF NETWORK ELEMENTS

BACKGROUND

Information technology (IT) networks may include network elements such as routers, switches and multi-layer switches. A network element includes forwarding elements that process data packets received by the network element. The processing may include forwarding the data packets to other network devices and/or computing devices. A network element may include many forwarding elements with complex interactions between the forwarding elements and the network element fabric that interconnects the forwarding elements. The detection of a malfunction of one or more of the forwarding elements may therefore be a non-trivial task.

SUMMARY

In general, in one aspect, a method for probing forwarding elements of a network element, the method comprising generating a first probing packet that comprises a first recirculation route, wherein the first recirculation route is configured to target a plurality of probed forwarding elements of the network element, specified in the first recirculation route by their corresponding forwarding element addresses, injecting the first probing packet into the network element, making a determination, based on not receiving a first returned probing packet associated with the first probing packet, that at least one probed forwarding element of the network element is non-operational.

In general, in one aspect, the invention relates to a system. The system includes a a computer processor, a network interface configured to interface the system with a network element, and a forwarding element probing engine executing on the computer processor, the forwarding element probing engine configured to: generate a first probing packet that comprises a first recirculation route, wherein the first recirculation route is configured to target a plurality of probed forwarding elements of the network element, specified in the first recirculation route by their corresponding forwarding element addresses, wherein the network interface is configured to: inject the first probing packet into the network element, comprising sending the first probing packet to the network element, wherein the forwarding element probing engine is further configured to: make a determination, based on not receiving a first returned probing packet associated with the first probing packet by the network interface, that at least one probed forwarding element of the network element is non-operational.

In general, in one aspect, the invention relates to a non-transitory computer readable medium (CRM) comprising computer readable program code, which when executed by a computer processor, enables the computer processor to: generate a first probing packet that comprises a first recirculation route, wherein the first recirculation route is configured to target a plurality of probed forwarding elements of the network element, specified in the first recirculation route by their corresponding forwarding element addresses, inject the first probing packet into the network element, make a determination, based on not receiving a first returned probing packet associated with the first probing packet, that at least one probed forwarding element of the network element is non-operational.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIG. 1, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for probing forwarding elements of network elements. A network element, e.g., a router, switch or a multi-layer switch, in accordance with one or more embodiments of the invention, may include any number of forwarding elements. In particular, large and modular network elements may include many forwarding elements. A forwarding element, in accordance with one or more embodiments of the invention, is a component that is configured to forward received network packets toward a destination of the network packet. The forwarding may involve sending a network packet, by the forwarding element, to another network element (e.g., another switch) or to a computing device (e.g. a server) via a physical port of the network element, or to another forwarding element within the network element, via a network element fabric that internally interconnects the forwarding elements, in the network element. Decisions regarding the forwarding of a data packet by a forwarding element may be made based on the destination of the packet, specified, e.g., in the packet header, by processing rules of the network element, defined, e.g., in a routing table, and/or by the physical connectivity that determines how the destination of the data packet may be reached. A more detailed description of a forwarding element is provided below, with reference to FIG. 1.

Although a forwarding element may include self-diagnosing and testing mechanisms, not all possible malfunctions of the forwarding element may be caught by this mechanism. In particular, a forwarding element may report proper functioning when self-diagnosed, while causing a malfunction during operation in a complex environment that includes many other forwarding elements and the fabric that interconnects these forwarding elements.

The use of probing packets, injected into the network elements, may allow the detection of such a malfunction. More specifically, a probing packet, in accordance with an embodiment of the invention, is expected to be returned by the network element. A probing packet that is not returned may indicate a malfunction of at least one of the forwarding elements (and/or any other component of the network element that is involved in the processing of the probing packet) that were targeted by the probing packet. Probing packets may be designed to specifically target forwarding elements, as further described in FIGS. 3-5, thus allowing to pinpoint the cause of the malfunction, e.g., a particular forwarding element, a particular combination of forwarding elements, etc., in accordance with one or more embodiments of the invention.

Figure 1:
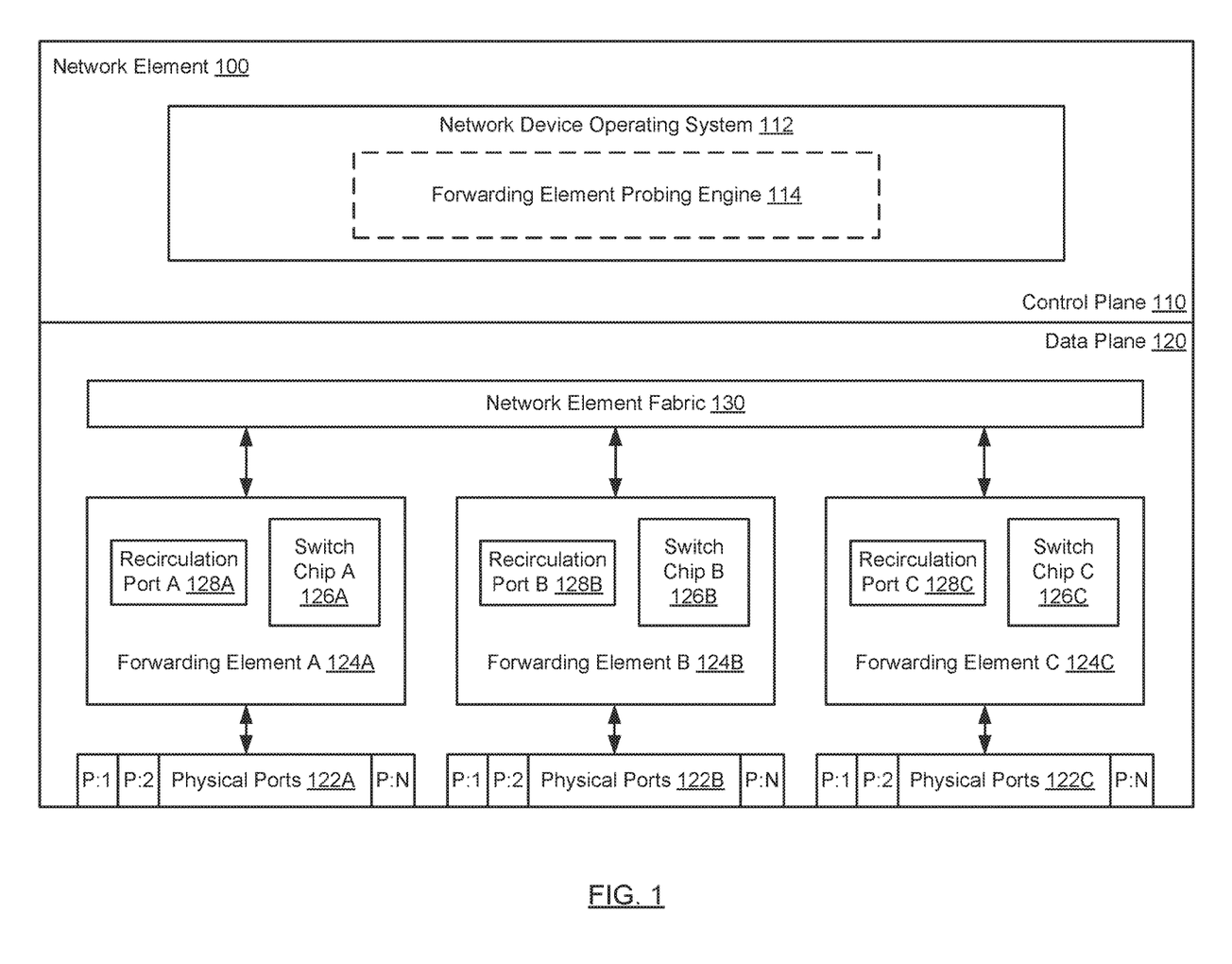
FIG. 1 shows a network element, in accordance with one or more embodiments of the invention.

FIG. 1 shows a network element, in accordance with one or more embodiments of the invention. The network element (100) may be a router, a switch or a multilayer switch. In one or more embodiments of the invention, the network element (100) includes executable instructions (stored on a non-transitory computer readable medium (not shown)) and hardware (e.g., a processor, memory, persistent storage, etc. (not shown)), configured to receive data packets from other network elements or computing devices, process the data packets, and send the data packets to other network elements or computing devices.

In one embodiment of the invention, the network element (100) includes a control plane (110) and a data plane (120). The control plane (110), in accordance with one or more embodiments of the invention, includes a network element operating system (OS) (112) executing in the control plane (110). The control plane (110), in accordance with an embodiment of the invention, governs the behavior of the network element, e.g., the switching and/or routing decisions that are being made in the data plane (120). In one or more embodiments of the invention, the network device OS (112) includes the forwarding element probing engine (114), i.e., software that includes functionality for probing forwarding elements of the network elements in accordance with one or more embodiments of the invention. The functions performed by the forwarding element probing engine (114) are described below, in FIGS. 3 and 4. The network device OS (112) and the forwarding element probing engine (114) may be executed on a processor (not shown) that may be located in the control plane (110), along with memory and persistent storage (not shown). In alternative embodiments of the invention, the forwarding element probing engine may be remote, i.e., not on the network element (100). In those embodiments of the invention, the forwarding element probing engine may be executing on a different network element or on a computing device, such as the computing device shown in FIG. 9.

The data plane (120) of the network element (100), in accordance with one or more embodiments of the invention, includes physical ports (122A-122C) that provide interfaces to other networks elements and/or computing devices. A physical port may be, for example, an electrical and/or optical Ethernet port. The physical ports (122A-122N) may interface with forwarding elements (124A-124C). Groups of physical ports may interface with a particular forwarding element such as illustrated in the exemplary network element (100) of FIG. 1, where the physical ports (122A) interface with the forwarding element A (124A), the physical ports (122B) interface with the forwarding element B (124B), and the physical ports (122C) interface with forwarding element C (124C). Any number of physical ports may be associated with a particular forwarding element.

A forwarding element (124), in accordance with one or more embodiments of the invention, is an element configured to forward received network packets toward a destination of the network packet, by directing the network packets to other switches, network devices, etc. The forwarding may occur by either directly sending a network packet via a physical port of the network element, if the appropriate physical port is interfacing with the forwarding element, or via another forwarding element. For example, a network packet being processed by forwarding element A (124A) may not be directly sent via one of the ports (122B) because these ports interface with forwarding element B (124B), but not with forwarding element A (124A). Accordingly, this packet may first be sent to forwarding element B (124B) via network element fabric (130), by forwarding element A (124A), and the data packet may then exit the network element via one of the ports (122B), sent by forwarding element B (124B).

A forwarding element (124), in accordance with an embodiment of the invention may include the elements to implement data packet forwarding for a range of ports that interface with the forwarding element. A forwarding element may include, for example, a switch chip (126), but also memory to store a forwarding information base (FIB), based on which switching and/or decisions are being made by the switch chip (126). Regardless of whether a switching or routing decisions is being made for a particular data packet, the data packet being processed is forwarded by the forwarding element, either via one of the ports that interface with the forwarding element, or to another forwarding element within the network element. The switch chip may be an application-specific integrated circuit (ASIC), a general-purpose processor such as a central processing unit (CPU), a field-programmable gate array (FPGA), or any other processing device capable of executing instructions for forwarding data packets. In modular network elements, one or more forwarding elements (124) may be organized on a line card of the network element, and the network element may be configured to accommodate many line cards, as needed to accommodate the switching and/or routing needs for data packets, e.g., in a data center.

In one embodiment of the invention, each forwarding element (124) includes a recirculation port (128). A recirculation port may enable the forwarding element to be internally reached (i.e., within the network element). For example, the forwarding element probing engine (114) may contact forwarding element A (124A) via recirculation port A (128A). Similarly, forwarding elements may also communicate, via the network element fabric (130), using their recirculation ports.

In one embodiment of the invention, a loopback address is associated with a recirculation port. This loopback address may be located in a reserved address space (e.g., in the 127.127/16 address space of an Internet Protocol (IP) based network). At least one recirculation port with a loopback address may exist for each of the forwarding elements (124A-124C). The loopback address associated with a forwarding element may, thus, be used as the probing packet destination address when sending a probing packet to the forwarding element. The assignment of loopback addresses to recirculation ports may be systematic. For example, the loopback address 127.127.3.4 may be used to address a fourth recirculation port on a third line card of the network element, the loopback address 127.127.4.1 may be used to address a first recirculation port on a fourth line card of the network element, etc.

The network element fabric (130), in accordance with one or more embodiments of the invention, provides an interface between the forwarding elements (124) of the network element (100). The network element fabric may be an electrical and/or optical bus that enables the forwarding elements (124) to exchange data packets.

One skilled in the art will recognize that the architecture of a network element is not limited to the components shown in FIG. 1. For example, the network element may include processors or memory not shown in FIG. 1. Further, while the exemplary network element of FIG. 1 is equipped with three network elements (124A-124C) a network element in accordance with an embodiment of the invention may include any number of forwarding elements with any number of ports, organized in various ways, e.g., by line cards.

Figure 2:
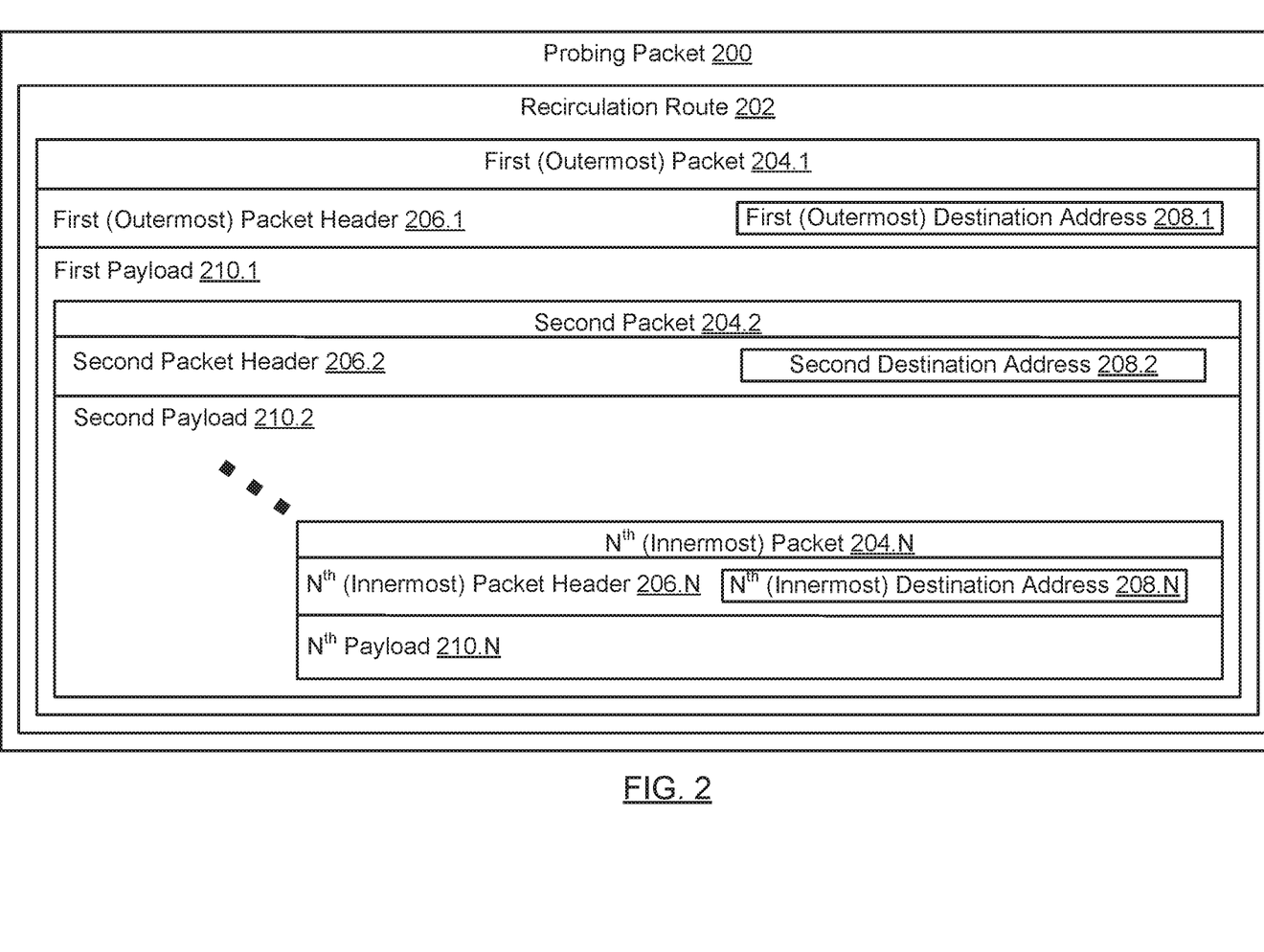
FIG. 2 shows a probing packet, in accordance with one or more embodiments of the invention.

FIG. 2 shows a probing packet, in accordance with one or more embodiments of the invention. The probing packet (200) is a packet generated by the forwarding element probing engine (114) to probe elements (such as forwarding elements) of the network element (100), in accordance with an embodiment of the invention. The probing packet (200), thus, includes a series of destination addresses that identify the elements to be probed. More specifically, the probing packet includes a set of data packets (204.1-204.N). Each of these data packets may have a packet header (206.1-206.N) and a Payload (210.1-210.N). In one or more embodiments of the invention, the payload (210) of a packet is another packet. In other words, the data packets (204.1-204.N) are nested, with the first data packet (201.1) being the outermost data packet and the N$^{th}$ data packet (204.N) being the innermost data packet. The probing packet (200), thus, establishes a recirculation route (202) that targets elements to be probed as specified by the destination addresses (208.1-208.N). The recirculation route (202) further defines an order in which the elements corresponding to the destination addresses (208.1-208.N) are targeted. Specifically, the probing packet may be processed in an order from the outermost data packet (204.1) to the innermost data packet (204.N).

For further illustration, consider the following scenario. A probing packet has the first destination address "A", a second destination address "B" and a third destination address "C". The probing packet was generated by a computing device to probe a network switch with the destination address "A". Destination address "B" is associated with a forwarding element to be probed, in the switch. Destination address "C" is the address of the computing device that hosts the forwarding element probing engine. When processed in the specified order, the probing packet is thus sent to the network switch with the destination address "A". Inside the network switch, the probing packet is directed to the forwarding element associated with the destination address "B", where it is determined that the probing packet is to be returned to the computing device identified by the destination address "C". Using this exemplary probing packet, it can, thus, be determined whether the forwarding element corresponding to the destination address "C" is operational. A non-operational forwarding element would result in the probing packet not being returned to the forwarding element probing engine. Those skilled in the art will recognized that a series of elements (rather than the single element associated with the address "B") may be probed using probing packets that include additional destination addresses. A detailed description of the processing of a probing packet is provided below, with reference to FIG. 5. Further, the generation, sending and receiving of a probing packet is described in FIGS. 3 and 4.

Those skilled in the art will appreciate that a probing packet may be based on different types of network protocols. The probing packet may, for example, be based on the Internet Protocol (IP), as previously described. In this case, the destination addresses (208.1-208.N) are IP addresses, e.g., IPv4 or IPv6 addresses. Other network protocols including multiprotocol standards such as the multiprotocol label switching (MPLS) may be used without departing from the invention. Generally, any protocol that allows the specification of a series of addresses may be used, without departing from the invention. The addresses used to identify the elements to be probed may be associated with various abstraction layers, without departing from the invention. For example, an address may be a link layer address, e.g., a hardware address such as a media access control (MAC) address, an IP address, a transport layer address, etc.

Figure 3:
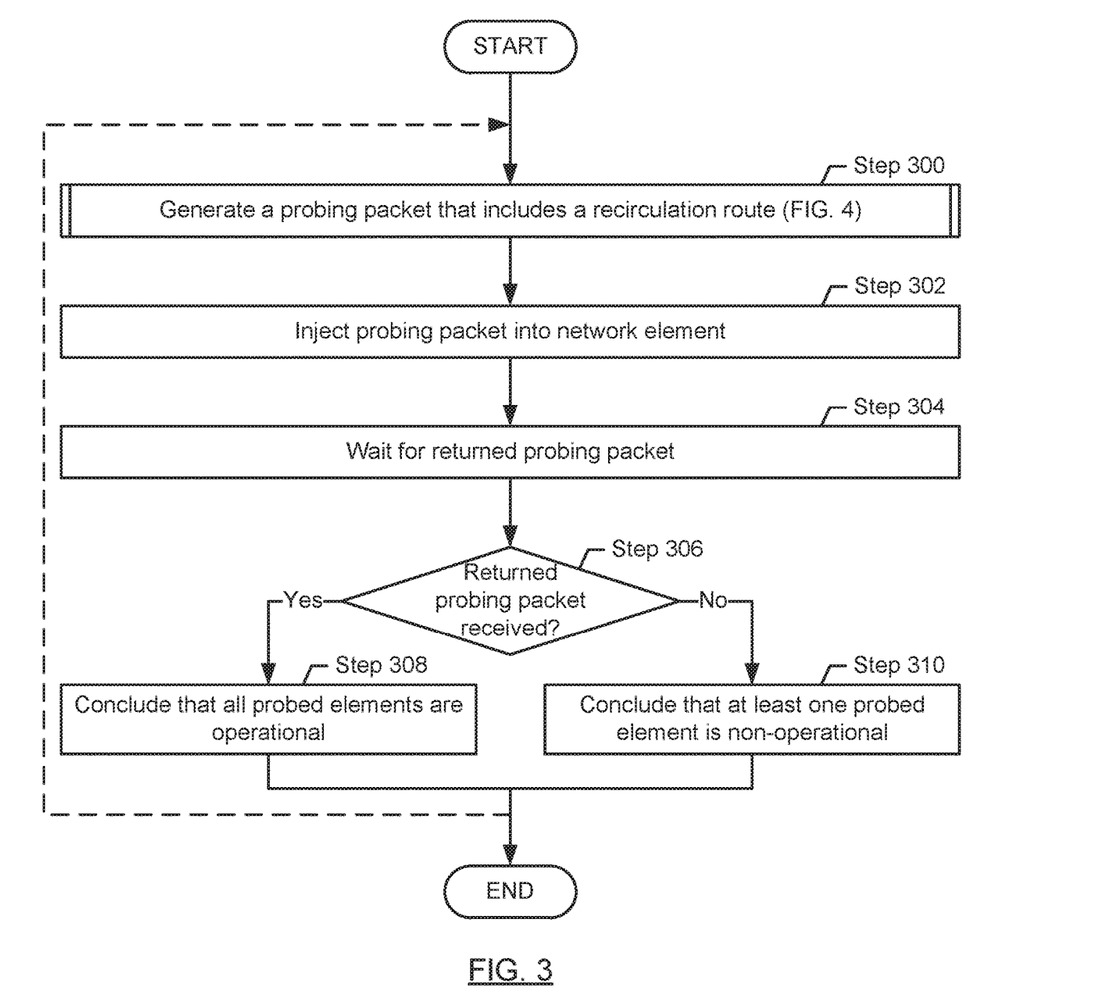
FIG. 3 shows a flowchart describing the probing of a network element using probing packets, in accordance with one or more embodiments of the invention.
Figure 4:
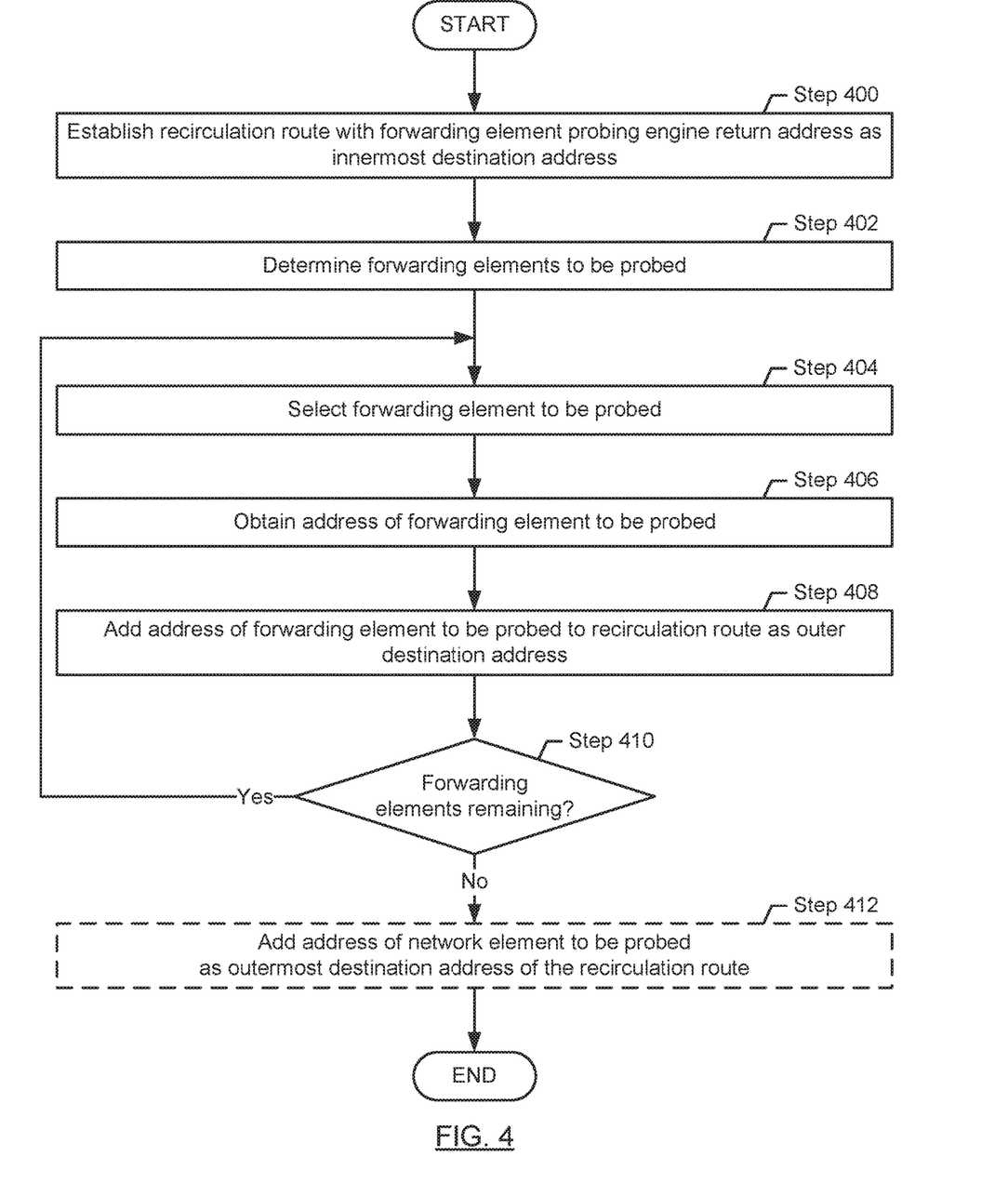
FIG. 4 shows a flowchart describing the generation of a probing packet, in accordance with one or more embodiments of the invention.
Figure 5:
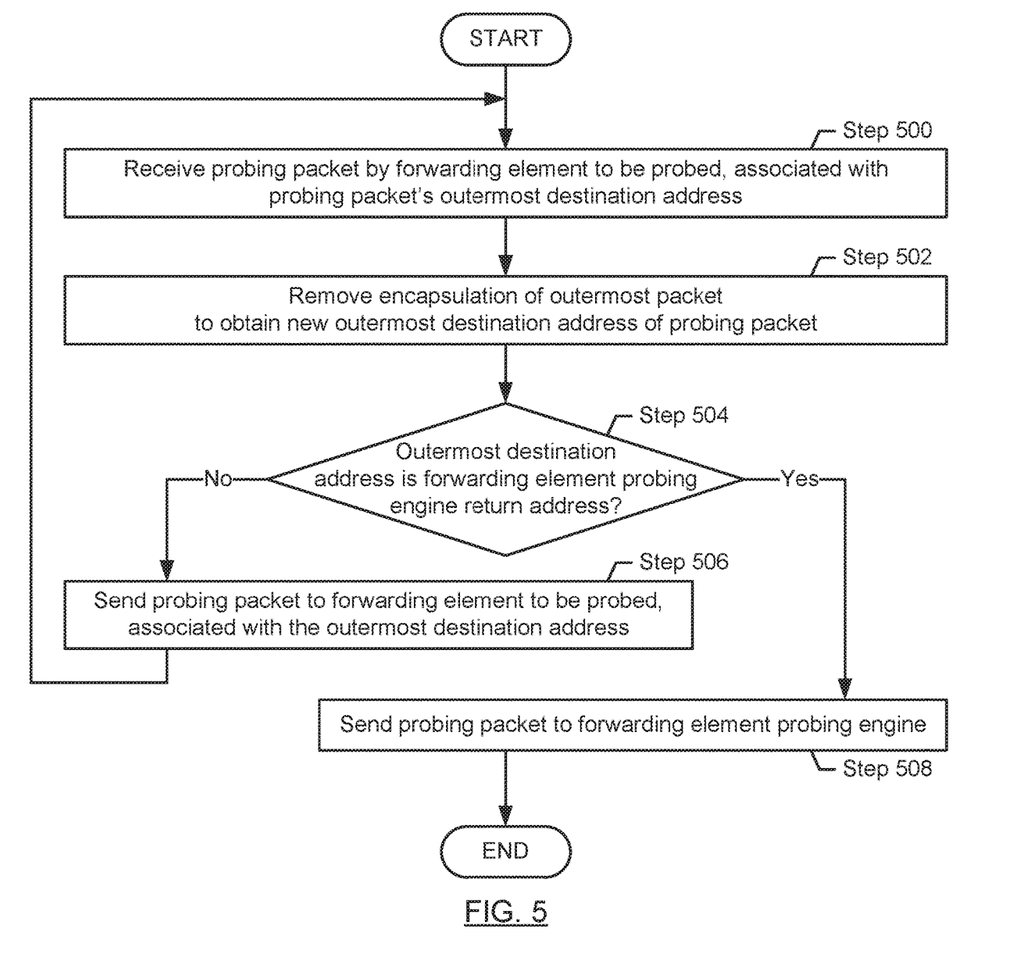
FIG. 5 shows a flowchart describing the processing of a probing packet by a network element, in accordance with one or more embodiments of the invention.

FIGS. 3-5 show flowcharts in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 3-5 may be performed in parallel with any other steps shown in FIGS. 3-5 without departing from the invention.

FIG. 3 shows a method for probing a network element using probing packets, in accordance with one or more embodiments of the invention. The method may be performed by the forwarding element probing engine that is either located on the network element being probed, or alternatively elsewhere, e.g., on another network element, a computing device, etc.

In Step 300, a probing packet that includes a recirculation route is generated. The probing packet may be crafted to target particular elements to be probed, or it may target randomly selected elements to be probed. The details of generating the probing packet are described in FIG. 4.

In Step 302, the probing packet is injected into the network element. Depending on whether the forwarding element probing engine is a component of the network element or a component located elsewhere, the injection may be differently performed. If the forwarding element probing engine is located in the control plane of the network element, the injection may be performed by directly sending the probing packet to the first forwarding element to be probed. Accordingly, in this scenario, the first destination address in the probing packet may address the recirculation port of the first forwarding element to be probed. Alternatively, if the forwarding element probing engine is located elsewhere, e.g., on a computing device that is connected to the network element via a network, the injection may be performed by first sending the probing packet to the network element that includes the forwarding elements to be probed. Accordingly, in this scenario, the first destination address in the probing packet is an address of the network element itself, and the probing packet may be injected via a physical link connecting to one of the physical ports of the network element. The difference in the method for injecting the probing packet into the network element is, thus, addressed by the design of the probing packet, as described in FIG. 4.

In Step 304, the forwarding element probing engine waits for a returned probing packet, and in Step 306, a determination is made about whether the returned probing packet has been received. If the returned probing packet has been received, the method may proceed to Step 308 where it is concluded that all probed elements of the network element are operational. If no returned probing packet has been received, the method may proceed to Step 310, where it is concluded that at least on probed element of the network element is non-operational.

After completion of Step 308 or 310, the method may either terminate, or alternatively, the execution of the method may repeat. Repeating the execution of the method may provide additional insights. Specifically, if, in Step 310, it was concluded that at least one probed element is non-operational, additional information about the non-operational element may be obtained by repeated execution of the method of FIG. 3. For example, after a single execution of the method of FIG. 3, it may not be clear which one of multiple probed elements is non-operational. However, repeated execution of the method of FIG. 3 with differently crafted probing packets that target different elements to be probed may enable isolation of a particular non-operational network element.

FIG. 4 shows a method for generating a probing packet, in accordance with one or more embodiments of the invention.

In Step 400, the recirculation route is established by specifying the address of the forwarding element probing engine as the innermost destination address of the recirculation route. In one or more embodiments of the invention, the innermost destination address serves as a return address, i.e., the address to which the probing packet is to be returned after the probing packet has passed all forwarding elements to be probed, as specified by other destination addresses in the probing packet. The destination address may alternatively be any other address at which the returned probing packet is expected. If the forwarding element probing engine is a component of the network element to be probed, the innermost destination address may be a loopback address specific to the forwarding element probing engine. Alternatively, if the forwarding element probing engine is an external component located, e.g., on a computing device, the destination address may be the address under which the device that hosts the forwarding element probing engine can be reached.

In Step 402, the forwarding elements to be probed, using the probing packet, are determined. In one or more embodiments of the invention, any number of forwarding elements of a network element may be probed either once or repeatedly, in any order. Various methods for selecting the forwarding elements to be probed exist.

In one embodiment of the invention, forwarding elements to be probed are randomly chosen from the forwarding elements of the network element. Any number of forwarding elements may be chosen. Randomly selecting forwarding elements may be useful, for example, to perform periodic checks of the forwarding elements in a preventive manner, e.g., if no known issues such as faulty behaviors are known to exist. Periodic execution may reveal forwarding element issues that may otherwise not be detected. Upon detection of an issue, based on randomly probing forwarding elements, a systematic probing may be performed to isolate the issue, as described below.

In one embodiment of the invention, forwarding elements to be probed are systematically chosen from the forwarding elements of the network element. The systematic choice may be based on, for example, a previously performed unsuccessful probing of the network element, i.e., a probing that did not result in the returning of the probing packet to the forwarding element probing engine. In such a scenario, the forwarding elements to be probed may be systematically chosen to isolate the non-operational probed element(s). In particular, after an unsuccessful probing of a set of forwarding elements, a subset of these forwarding elements may be selected for the next probing cycle. The underlying idea is that if probing of this subset of forwarding elements results in a return of the probing packet, the non-operational probed forwarding element can be identified as one of the elements that were eliminated from the set of probed forwarding elements, when the subset was generated. Alternatively, if the probing packet is, again, not returned, an additional probing cycle with an even smaller subset of forwarding elements may be performed, until the non-operational forwarding element is identified by elimination.

In one embodiment of the invention, forwarding elements to be probed are chosen based on a set schedule. For example, the schedule may establish that all or a particular set of forwarding elements are to be probed.

Additionally or alternatively, the order in which forwarding elements are probed may be varied. Changing the order in which the probing packets passes the forwarding elements to be probed may reveal issues that are specific to particular interactions of network elements. For example, while a forwarding element "A" may pass a probing packet to forwarding element "B", it may fail to pass a probing packet to forwarding element "C". This failure may be discovered when probing the forwarding elements in the order "A-C-B", but not when probing the forwarding elements in the order "A-B-C".

One of the above-discussed approaches for selecting forwarding elements to be probed may be consistently used, or alternatively, the approach for selecting forwarding elements may be changed depending on whether the occurrence of a non-operational network element was detected. For example, initially the forwarding elements to be probed may be randomly chosen, or they may be chosen based on a schedule. When the occurrence of a non-operational network element is detected, the method may switch to the systematic approach to isolate the non-operational network element, through elimination.

In order to perform the above-discussed approaches for selecting forwarding elements, it may be necessary for the forwarding element probing engine to be aware of the forwarding element configuration of the network element. The forwarding element probing engine is thus configured to have access to the forwarding element configuration of the network element to be probed, in accordance with an embodiment of the invention. The forwarding element probing engine may include or have access to a record that documents the forwarding elements and their addresses and/or the forwarding element probing engine may be able to query the network element for existing forwarding element information.

In Step 404, a forwarding element to be probed is selected from the forwarding elements obtained in Step 402. Any one of the obtained forwarding elements may be selected. Alternatively, if the probing of the forwarding elements is to be performed in a specific order, the selection of the forwarding element may consider this order. In the case of a set of nested data packets being used for establishing the recirculation route, as illustrated in FIG. 2, the probing packet is processed from the outermost packet to the innermost packet. Accordingly, the order in which packets are added to the recirculation route may be based on the design of the probing packet as a set of nested data packets.

In Step 406, the address of the forwarding element to be probed, selected in Step 404, is obtained from the record of the network element to be probed, and in Step 408, the address of the forwarding element to be probed is added as a destination address to the recirculation route established by the probing packet, as illustrated, for example, in FIG. 2.

In Step 410, a determination is made about whether forwarding elements to be probed are remaining. If forwarding elements to be probed are remaining, the method may return to Step 404 to repeat Steps 404-408, until no more forwarding elements to be probed are remaining.

In Step 412, the address of the network element that includes the forwarding elements to be probed is added to the recirculation route as the outermost destination address. Step 412 may be necessary if the network element probing engine is external to the network element. In this case, the address of the network element directs the packet to the network element via a link between the device that hosts the network element probing engine and the network element. The probing packet may thus enter the network element via one of the physical ports of the network element. In contrast, if the network element probing engine is hosted by the network element itself, e.g., in the control plane, the execution of Step 412 may be unnecessary because the probing packet can be immediately directed to the first forwarding element to be probed, using the address of that forwarding element.

After the execution of the method described in FIG. 4, a probing packet has been established, that includes a set of nested packets that may be processed starting from the outermost packet to the innermost packet. This processing order of the probing packet establishes the probing order of the forwarding elements of the network element, in accordance with an embodiment of the invention. While the outermost address may be either the address of the first forwarding element to be probed or the address of the network element itself, the innermost address is the return address that directs the probing packet to be returned back to the forwarding element probing engine, in accordance with an embodiment of the invention.

FIG. 5 shows a method for processing a probing packet by a network element, in accordance with one or more embodiments of the invention.

In Step 500, a probing packet, provided by the forwarding element probing engine, is received by the forwarding element to be probed, specified by the outermost destination address of the probing packet. Alternatively, if the probing packet was provided by a forwarding element engine that is external to the network element, the probing packet may be received by a forwarding element that has an interface to the physical port at which the probing packet is received by the network element. In this case, the receiving forwarding element is not necessarily a forwarding element to be probed.

In Step 502, the encapsulation of the outermost packet is removed to obtain a new outermost destination address of the probing packet. Consider, for example, the probing packet illustrated in FIG. 2. After the execution of Step 500, in Step 502, the first packet header is removed and therefore the second packet header becomes the outermost packet header.

In Step 504, a determination is made about whether the outermost destination address is the forwarding element probing engine return address. An outermost destination address that is the forwarding element probing engine return address indicates that the last (innermost) packet of the probing packet with the innermost destination address has been reached, thus signaling that the end of the recirculation route has been reached. Accordingly, if the outermost destination address is the forwarding element probing engine return address, in Step 508, the probing packet is sent to the forwarding element probing engine.

If a determination is made that the outermost destination address is not the forwarding element probing engine return address, the assumption is that the outermost destination address is associated with another forwarding element to be probed, and accordingly the method returns to Step 500.

Execution of the method if FIG. 5 thus results in the probing of all forwarding elements in the order specified by the recirculation route, from the outermost destination address to the innermost destination address.

The use case scenarios described below are intended to provide example of the method for probing forwarding elements of network elements, described in FIGS. 3-5. The use case scenarios are based on exemplary network switches, shown in FIGS. 6-8 and are for illustrative purposes only. The methods described by FIGS. 3-5 are not limited to the network switches shown in FIGS. 6-8, but rather are universally applicable to different network elements of various types and configurations.

Figure 6:
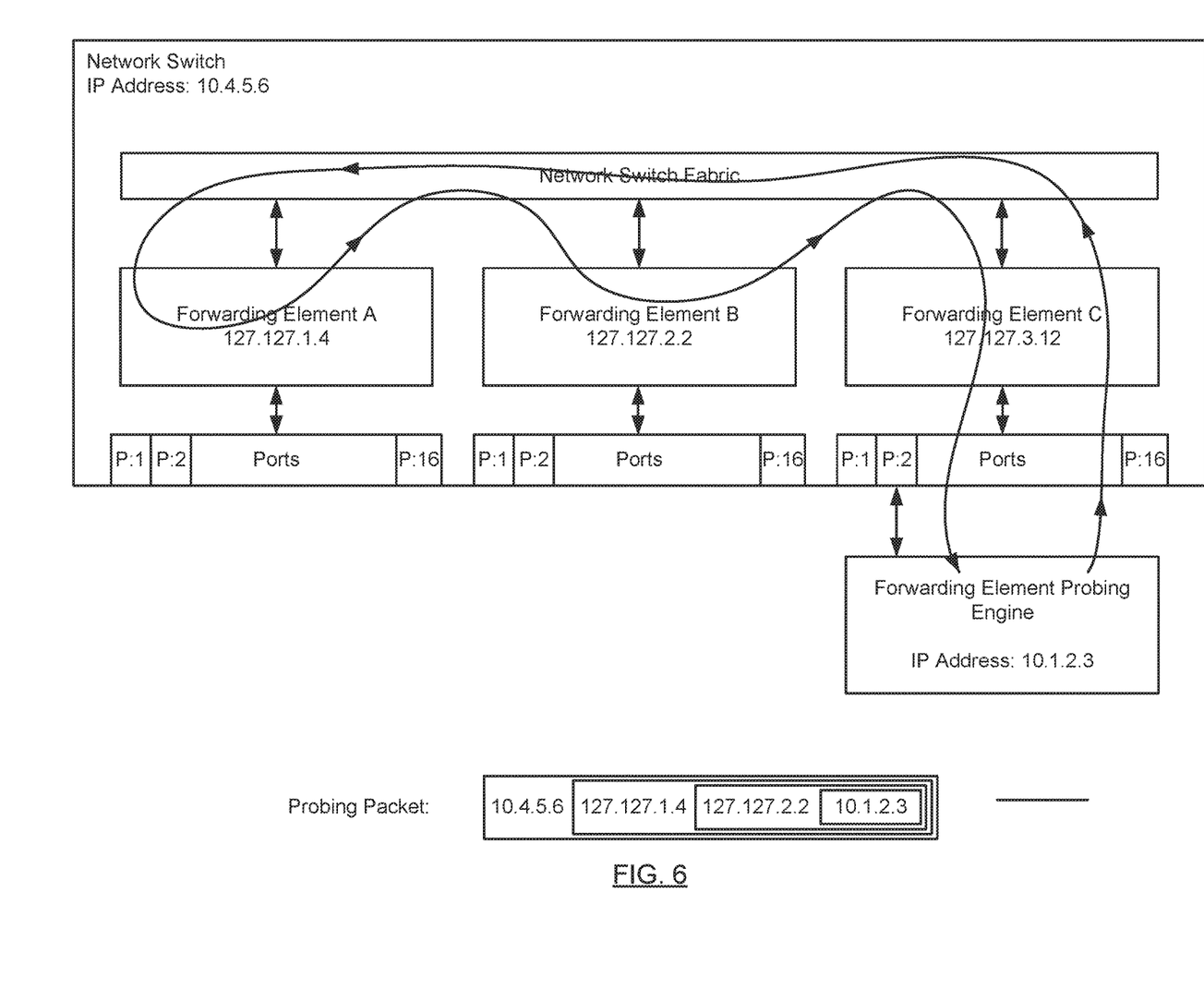
FIGS. 6-8 show network elements being probed, in accordance with one or more embodiments of the invention.

FIG. 6 shows a network switch with an associated IP address, 10.4.5.6 and a forwarding element probing engine that is located on a computing device with an associated IP address, 10.1.2.3. The network switch includes three forwarding elements, A, B, and C. Each of the forwarding element interfaces with 16 Ethernet ports. Further, each of the forwarding elements has a recirculation port with an IP address that may be used to directly address the forwarding element. Forwarding element A is reachable via the loopback IP address 127.127.1.4, forwarding element B is reachable via the loopback IP address 127.127.2.2, and forwarding element C is reachable via the loopback IP address 127.127.3.12.

FIG. 6 further shows a probing packet that has been designed to probe the forwarding elements of the network switch. The probing packet includes a set of nested packets with the IP addresses 10.4.5.6, 127.127.1.4, 127.127.2.2 and 10.1.2.3, in this order. When sent by the forwarding element probing engine, the probing packet is directed to an Ethernet port under the administration of forwarding element C. While the link between the Ethernet port of the network switch and the forwarding element probing engine is shown as direct, those skilled in the art will recognize that in real-world network scenarios, other (many) network devices may be between the forwarding element probing engine and the port network switch.

The received probing packet is necessarily processed by forwarding element C, which removes the outermost header of the probing packet to expose the next destination address, 127.127.1.4. Forwarding element C then forwards the processed probing packet to forwarding element A, associated with the destination address 127.127.1.4, via the network switch fabric.

Forwarding element A processes the received probing packet by, again, removing the outermost header of the probing packet to expose the next destination address, 127.127.2.2. Forwarding element A then forwards the processed probing packet to forwarding element B, associated with the destination address 127.127.2.2, via the network switch fabric.

Forwarding element B processes the received probing packet by, again, removing the outermost header of the probing packet to expose the next destination address, 10.1.2.3. Forwarding element B determines that the destination address, 10.1.2.3, can be reached via forwarding element C, and thus forwards the processed probing packet to forwarding element C, via the network switch fabric.

Forwarding element C determines that the destination address, 10.1.2.3 can be reached via Ethernet port 2 and thus sends the probing packet via Ethernet port 2. The returned probing packet is then received by the forwarding element probing engine. Based on the returned probing packet, the forwarding element probing engine concludes that all probed forwarding elements are functional.

Figure 7:
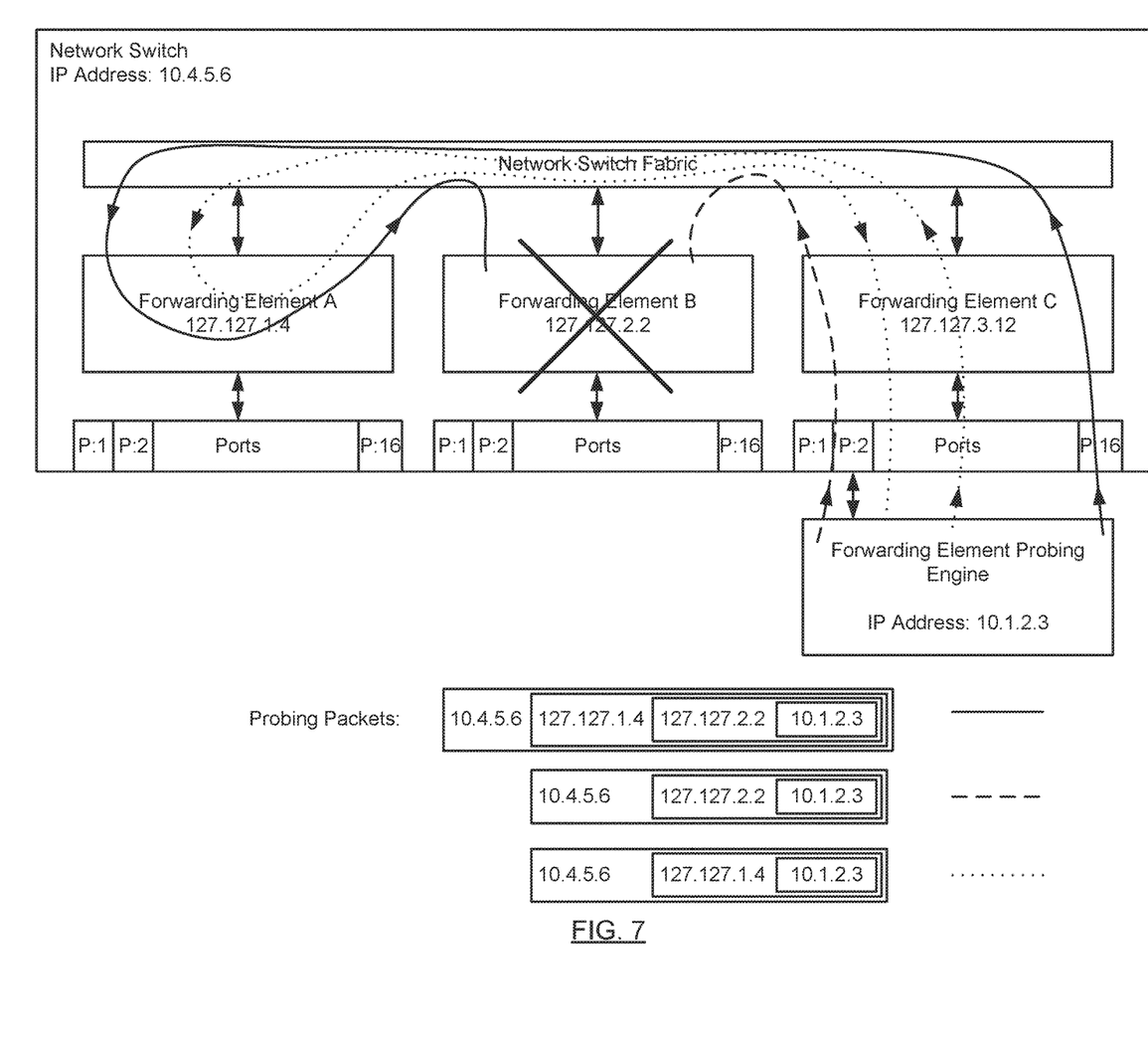

FIG. 7 shows the network switch and the forwarding element probing engine, previously discussed with reference to FIG. 6.

FIG. 7 further shows a first probing packet that is identical to the probing packet previously discussed with reference to FIG. 6. In addition, FIG. 7 shows a second and a third probing packet that are discussed below.

When sent by the forwarding element probing engine, the first probing packet is directed to Ethernet port two, under the administration of forwarding element C. The received first probing packet is processed by forwarding element C, which removes the outermost header of the first probing packet to expose the next destination address, 127.127.1.4. Forwarding element C then forwards the processed first probing packet to forwarding element A, associated with the destination address 127.127.1.4, via the network switch fabric.

Forwarding element A processes the received first probing packet by, again, removing the outermost header of the first probing packet to expose the next destination address, 127.127.2.2. Forwarding element A then forwards the processed first probing packet to forwarding element B, associated with the destination address 127.127.2.2, via the network switch fabric.

Forwarding element B fails to processes the received first probing packet. Accordingly, the first probing packet is not returned to the forwarding element probing engine. The forwarding element probing engine, after having been waiting for the returned first probing packet for a set amount of time, concludes that one of the probed forwarding elements is non-operational. The progression of the first probing packet through the network switch is indicated by the solid curved line.

In an attempt to identify the non-operational forwarding element by elimination, the forwarding element probing engine generates the second probing packet. The second probing packet includes a set of nested packets with the IP addresses 10.4.5.6, 127.127.2.2 and 10.1.2.3, in this order.

When sent by the forwarding element probing engine, the second probing packet is directed to Ethernet port two, under the administration of forwarding element C. The received second probing packet is processed by forwarding element C, which removes the outermost header of the second probing packet to expose the next destination address, 127.127.2.2. Forwarding element C then forwards the processed second probing packet to forwarding element B, associated with the destination address 127.127.2.2, via the network switch fabric.

Forwarding element B fails to processes the received second probing packet. Accordingly, the second probing packet is also not returned to the forwarding element probing engine. The forwarding element probing engine, after having been waiting for the returned second probing packet for a set amount of time, concludes that one of the probed forwarding elements is non-operational. The progression of the second probing packet through the network switch is indicated by the dashed curved line.

Next, in an additional attempt to identify the non-operational forwarding element by elimination, the forwarding element probing engine generates the third probing packet. The third probing packet includes a set of nested packets with the IP addresses 10.4.5.6, 127.127.1.4 and 10.1.2.3, in this order.

When sent by the forwarding element probing engine, the third probing packet is directed to Ethernet port two, under the administration of forwarding element C. The received third probing packet is processed by forwarding element C, which removes the outermost header of the third probing packet to expose the next destination address, 127.127.1.4. Forwarding element C then forwards the processed third probing packet to forwarding element A, associated with the destination address 127.127.1.4, via the network switch fabric.

Forwarding element A processes the received third probing packet by, again, removing the outermost header of the third probing packet to expose the next destination address, 10.1.2.3. Forwarding element A determines that the destination address, 10.1.2.3, can be reached via forwarding element C, and thus forwards the processed third probing packet to forwarding element C, via the network switch fabric.

Forwarding element C determines that the destination address, 10.1.2.3 can be reached via Ethernet port 2 and thus sends the third probing packet via Ethernet port 2. The returned third probing packet is then received by the forwarding element probing engine. Based on the returned probing packet, the forwarding element probing engine concludes that all probed forwarding elements are functional. The progression of the third probing packet through the network switch is indicated by the dotted curved line.

Based on only the third probing packet, but not the first and the second probing packets being returned to the forwarding element probing engine, the forwarding element probing engine concludes that forwarding element B is the non-operational forwarding element.

Figure 8:
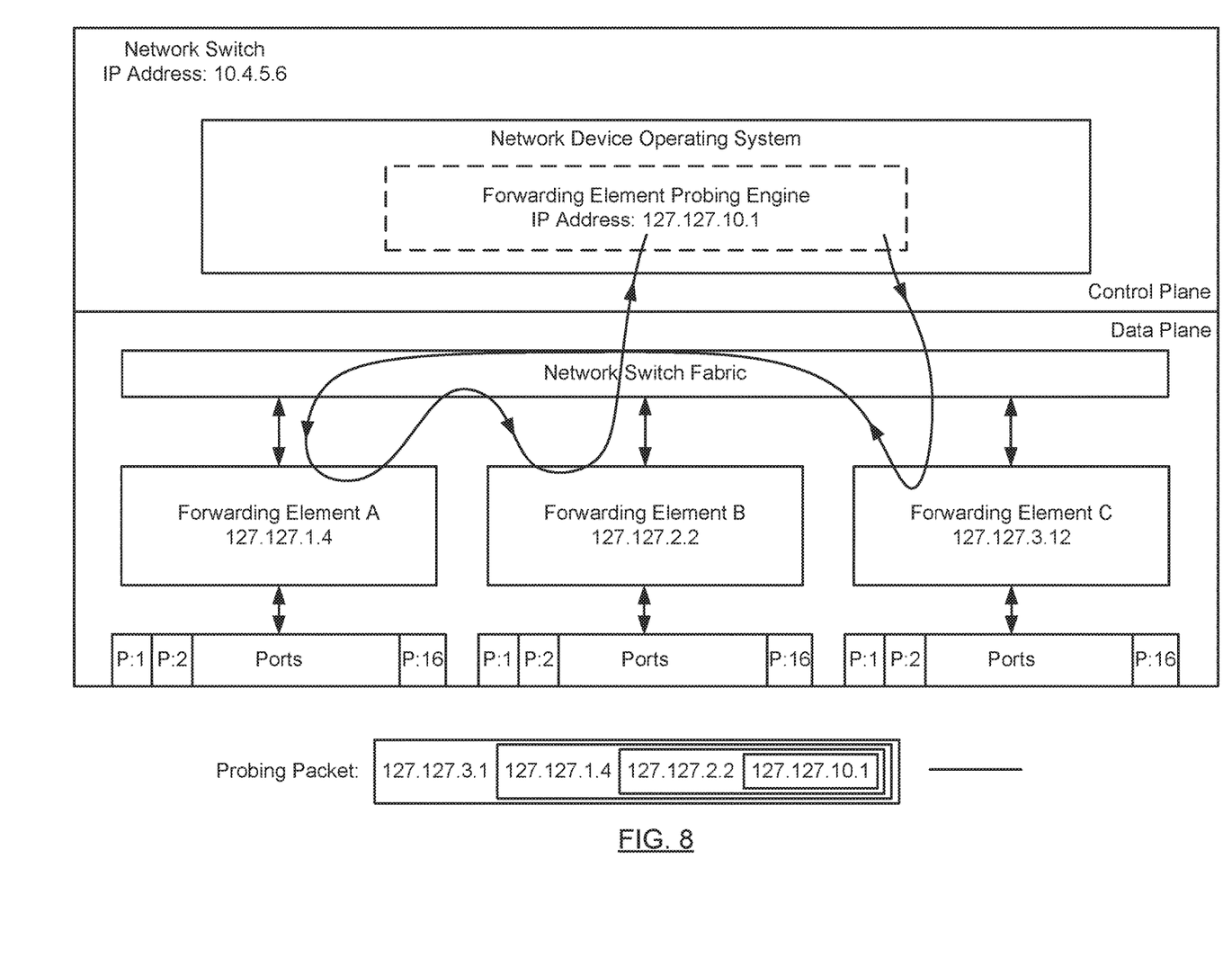

FIG. 8 shows a network switch with an associated IP address, 10.4.5.6 and a forwarding element probing engine that is located in the control plane of the network switch. The network switch includes three forwarding elements, A, B, and C. Each of the forwarding element interfaces with 16 Ethernet ports. Further, each of the forwarding elements has a recirculation port with an IP address that may be used to directly address the forwarding element. Forwarding element A is reachable via the loopback IP address 127.127.1.4, forwarding element B is reachable via the loopback IP address 127.127.2.2, and forwarding element C is reachable via the loopback IP address 127.127.3.12. Further, the forwarding element probing engine is reachable via the loopback IP address 127.127.10.1.

FIG. 8 further shows a probing packet that has been designed to probe the forwarding elements of the network switch. The probing packet includes a set of nested packets with the IP addresses 127.127.3.1, 127.127.1.4, 127.127.2.2 and 10.1.2.3, in this order. The probing packet is, thus, different from the probing packet shown in FIG. 6, by directly addressing forwarding element C (using the associated IP address 127.127.3.1), rather than first targeting the network switch using the network switch address, 10.4.5.6.

The forwarding element probing engine, sends the probing packet to forwarding element C, associated with the destination address 127.127.3.1, via the network switch fabric.

Forwarding element C processes the received probing packet by removing the outermost header of the probing packet to expose the next destination address, 127.127.1.4. Forwarding element C then forwards the processed probing packet to forwarding element A, associated with the destination address 127.127.1.4, via the network switch fabric.

Forwarding element A processes the received probing packet by, again, removing the outermost header of the probing packet to expose the next destination address, 127.127.2.2. Forwarding element A then forwards the processed probing packet to forwarding element B, associated with the destination address 127.127.2.2, via the network switch fabric.

Forwarding element B processes the received probing packet by, again, removing the outermost header of the probing packet to expose the next destination address, 127.127.10.1. Forwarding element B then forwards the processed probing packet to the forwarding element probing engine, associated with the destination address 127.127.10.1, via the network switch fabric.

The returned probing packet is then received by the forwarding element probing engine. Based on the returned probing packet, the forwarding element probing engine concludes that all probed forwarding elements are functional.

Embodiments of the invention may enable the detection and localization of abnormalities in network elements that may otherwise not be detected. Specifically embodiments of the invention may enable the detection of issues that arise from the interaction of forwarding elements of a network element. While an individual forwarding element, when probed in an isolated manner, may perform normally, it may nevertheless malfunction, when interacting with other forwarding elements, e.g., in a specific manner and/or in a specific order. Embodiments of the invention may enable the detection of such malfunctions by probing the forwarding elements in a manner that does require interaction between multiple forwarding elements. Interactions between different forwarding elements, different orders of interactions and different complexities of interactions may be tested, based on the design of the probing packet that is injected in the network element to be probed. When a malfunction is detected, embodiments of the invention enable the localization of the malfunction by systematically isolating the non-operational forwarding element responsible for the malfunction. Embodiments of the invention further enable periodic probing of network elements for potential failures, which may be useful for monitoring purposes in seemingly fully operational network elements.

Figure 9:
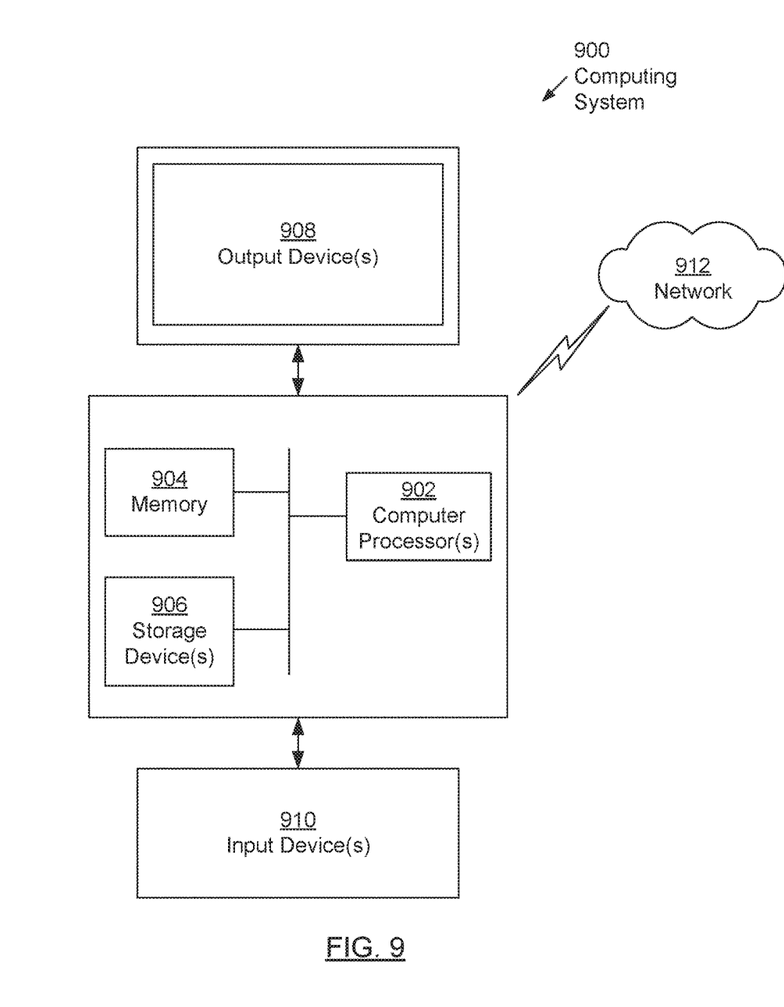
FIG. 9 shows a computing system, in accordance with one or more embodiments of the invention.

Embodiments of the technology may be implemented on a computing system. Any combination of mobile, desktop, server, embedded, or other types of hardware may be used. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (900) may be located at a remote location and connected to the other elements over a network (912). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for probing forwarding elements of a network element, the method comprising:
   generating, by a forwarding element probing engine within the network element, a first probing packet that comprises a first recirculation route, wherein:
      the first recirculation route is configured to target a plurality of probed forwarding elements of the network element, specified in the first recirculation route by their corresponding forwarding element addresses, and
      the forwarding element addresses cause the first probing packet to remain within the network element;

injecting the first probing packet into a first forwarding element of the plurality of probed forwarding elements of the network element;

making a determination, based on not receiving, at the forwarding element probing engine, a first returned probing packet associated with the first probing packet, that a probed forwarding element of the network element is non-operational.

2. The method of claim 1, wherein the first probing packet after injection into the network element, is forwarded between forwarding elements of the plurality of probed forwarding elements, in an order specified by the forwarding element addresses in the recirculation route.

3. The method of claim 1, further comprising:

generating a second probing packet that comprises a second recirculation route;

injecting the second probing packet into the network element;

receiving a second returned probing packet associated with the second probing packet;

making a determination, based on receiving the second returned probing packet, that all probed forwarding elements of the network element are operational.

4. The method of claim 1, further comprising:

generating a plurality of additional probing packets, wherein each of the plurality of additional probing packets comprises a separate recirculation route that is different from other recirculation routes of other probing packets of the plurality of additional probing packets;

injecting the plurality of additional probing packets into the network element;

isolating, based on which returned probing packets associated with the plurality of additional probing packets are returned, the probed forwarding element of the network element that is non-operational.

5. The method of claim 4, wherein each separate recirculation route is obtained by varying at least one selected from a group consisting of forwarding elements selected for the recirculation route, and an order of the selected forwarding elements.

6. The method of claim 4, wherein the generating of the plurality of additional probing packets and the injecting of the plurality of additional probing packets are continued until the probed forwarding element that is non-operational is unambiguously isolated.

7. The method of claim 1, wherein the network element is one selected from a group consisting of a router, a switch and a multi-layer switch.

8. The method of claim 1, wherein the forwarding element addresses of the probed forwarding elements are internet protocol (IP) addresses.

9. A network element comprising:

a computer processor;

a network interface configured to interface the system with a network element; and a forwarding element probing engine executing on the computer processor, the forwarding element probing engine configured to:

generate a first probing packet that comprises a first recirculation route, wherein:

the first recirculation route is configured to target a plurality of probed forwarding elements of the network element, specified in the first recirculation route by their corresponding forwarding element addresses, and the forwarding element addresses cause the first probing packet to remain within the network element;

wherein the network interface is configured to:

inject the first probing packet into a first forwarding element of the plurality of probed forwarding elements of the network element;

wherein the forwarding element probing engine is further configured to:

make a determination, based on not receiving, at the forwarding element probing engine, a first returned probing packet associated with the first probing packet by the network interface, that a forwarding element of the network element is non-operational.

10. The system of claim 9, wherein the order of the forwarding element addresses in the recirculation route determines an order in which the injected probing packet is to be forwarded between the corresponding forwarding elements of the network element.

11. The system of claim 9, wherein the forwarding element probing engine is further configured to:

generate a second probing packet that comprises a second recirculation route;

wherein the network interface is further configured to:

inject the second probing packet into the network element; and receive a second returned probing packet associated with the second probing packet;

wherein the forwarding element configuration engine is further configured to:

make a determination, based on receiving the second returned probing packet, that all probed forwarding elements of the network element are operational.

12. The system of claim 9, wherein the forwarding element probing engine is further configured to:

generate a plurality of additional probing packets, wherein each of the plurality of additional probing packets comprises a separate recirculation route that is different from other recirculation routes of other probing packets of the plurality of additional probing packets;

wherein the network interface is further configured to:

inject the plurality of additional probing packets into the network element; and receive additional returned probing packets associated with only a portion of the plurality of additional probing packets;

wherein the forwarding element probing engine is further configured to:

isolate, based on which additional returned probing packets are received, the probed forwarding element of the network element that is non-operational.

13. The system of claim 12, wherein each separate recirculation route is obtained by varying at least one selected from a group consisting of forwarding elements selected for the recirculation route, and an order of the selected forwarding elements.

14. The system of claim 12, wherein the generating of the plurality of additional probing packets and the injecting of the plurality of additional probing packets are continued until the probed forwarding element that is non-operational is unambiguously isolated.

15. A non-transitory computer readable medium (CRM) comprising computer readable program code, which when executed by a computer processor, enables the computer processor to:
- generate a first probing packet that comprises a first recirculation route, wherein:
  - the first recirculation route is configured to target a plurality of probed forwarding elements of the network element, specified in the first recirculation route by their corresponding forwarding element addresses,
  - and
  - the forwarding element addresses cause the first probing packet to remain within the network element;
- inject the first probing packet into a first forwarding element of the plurality of probed forwarding elements of the network element; and
- make a determination, based on not receiving, at the forwarding element probing engine, a first returned probing packet associated with the first probing packet, that a probed forwarding element of the network element is non-operational.

16. The non-transitory CRM of claim 15, wherein the first probing packet, after injection into the network element, is forwarded between forwarding elements of the plurality of probed forwarding elements, in an order specified by the forwarding element addresses in the recirculation route.

17. The non-transitory CRM of claim 15, wherein the computer readable program code further enables the computer processor to:
- generate a second probing packet that comprises a second recirculation route;
- inject the second probing packet into the network element;
- receive a second returned probing packet associated with the second probing packet;
- make a determination, based on receiving the second returned probing packet, that all probed forwarding elements of the network element are operational.

18. The non-transitory CRM of claim 15, wherein the computer readable program code further enables the computer processor to:
- generate a plurality of additional probing packets, wherein each of the plurality of additional probing packets comprises a separate recirculation route that is different from other recirculation routes of other probing packets of the plurality of additional probing packets;
- inject the plurality of additional probing packets into the network element;
- receive additional returned probing packets associated with only a portion of the plurality of additional probing packets; and
- isolate, based on which additional returned probing packets are received, the probed forwarding element of the network element that is non-operational.

19. The non-transitory CRM of claim 18,
- wherein each separate recirculation route is obtained by varying at least one selected from a group consisting of forwarding elements selected for the recirculation route, and an order of the selected forwarding elements.

20. The non-transitory CRM of claim 18, wherein, the generating the plurality of additional probing packets and the injecting the plurality of additional probing packets are continued until the probed forwarding element that is non-operational is unambiguously isolated.

* * * * *

UNITED STATES PATENT AND TRADEMARK OFFICE
CERTIFICATE OF CORRECTION

PATENT NO. : 10,644,975 B2
APPLICATION NO. : 15/671454
DATED : May 5, 2020
INVENTOR(S) : Kenneth J. Duda and Hugh W. Holbrook Page 1 of 1

It is certified that error appears in the above-identified patent and that said Letters Patent is hereby corrected as shown below:

In the Claims

Column 18, Lines 28-29, Claim 20, the phrase "the generating the plurality" should read -- generating the plurality --.

Column 18, Line 30, Claim 20, the phrase "the injecting the plurality" should read -- injecting the plurality --.

Signed and Sealed this
Twenty-third Day of June, 2020

Andrei Iancu
*Director of the United States Patent and Trademark Office*